United States Patent [19]
Briet

[11] Patent Number: 5,129,683
[45] Date of Patent: Jul. 14, 1992

[54] QUICK COUPLING DEVICE, IN PARTICULAR FOR FLUID DUCTS IN A MOTOR VEHICLE

[76] Inventor: Gilles Briet, Le Petit Vallot, Neuvy Granchamp, 71130, Gueugnon, France

[21] Appl. No.: 409,805

[22] Filed: Sep. 20, 1989

[30] Foreign Application Priority Data

Sep. 21, 1988 [FR] France ............................ 88 12312

[51] Int. Cl.⁵ .............................................. F16L 35/00
[52] U.S. Cl. ...................................... 285/93; 285/320; 285/921
[58] Field of Search .................. 285/93, 319, 921, 320

[56] References Cited

U.S. PATENT DOCUMENTS

| | | |
|---|---|---|
| 831,358 | 9/1906 | Lally . |
| 2,150,765 | 3/1939 | Forsberg . |
| 2,419,916 | 4/1947 | Raffield . |
| 4,738,474 | 4/1988 | Jacob et al. .................. 285/93 X |
| 4,753,458 | 6/1988 | Case et al. ...................... 285/93 |

FOREIGN PATENT DOCUMENTS 2600611 7/1976 France .
1506962 12/1978 United Kingdom .

*Primary Examiner*—Dave W. Arola

[57] ABSTRACT

A quick coupling device including a snap-fastening finger (16) for engaging a portion (26) of a suitable complementary structure, and a tab (30) rotatably mounted on the finger (16) to unmask a stud (42) when the coupling device is incorrectly coupled to the complementary structure (14). The invention is particularly suitable for quick couplings for pipes and ducts as used in the car industry.

9 Claims, 1 Drawing Sheet

QUICK COUPLING DEVICE, IN PARTICULAR FOR FLUID DUCTS IN A MOTOR VEHICLE

The invention relates to a quick coupling device, intended in particular for pipes and ducts such as those in the circuits for cooling a motor vehicle engine, or for heating or air conditioning the vehicle cabin.

BACKGROUND OF THE INVENTION

It is already well known to provide quick coupling devices on pipes and ducts through which a fluid flows for the purpose of providing a sealed connection either between two pipes or ducts connected end-to-end, or else between a pipe and a fluid inlet or outlet end-fitting or tube. These devices have the advantage of providing a sealed connection by means of a movement which is very simple, e.g. translation or rotation through one fourth of a turn.

However, it may happen that this motion is not carried right through so that the quick coupling device is not locked in its correct coupling position. In such cases, vibration, any kind of movement in the pipe, or a change in pressure of the fluid can cause the quick coupling device to come apart immediately, thereby separating the interconnected pipes and giving rise to large quantities of fluid leakage.

Such accidents are particularly likely to occur on manufacturing lines which are automated to a greater or lesser extent, e.g. in the car industry.

The object of the invention is to provide a quick coupling device suitable for providing immediate visual verification that the device has been correctly coupled.

SUMMARY OF THE INVENTION

The present invention provides a quick coupling device, in particular for pipes and ducts such as those used in a circuit for heating a vehicle cabin or for cooling a vehicle engine, the device comprising at least one elastically deformable snap-fastening finger for fixing the device to a suitable complementary structure, wherein the device further comprises means for providing visual confirmation that the device has been correctly coupled, said means comprising a tab associated with the snap-fastening finger by link means causing said tab to take up a first position when the snap-fastening finger is in its position corresponding to the device being correctly coupled, and a different position when the snap-fastening finger is displaced from said coupling position.

Thus, according to the invention, the position of a tab on the quick coupling device can be used to verify whether the device is correctly coupled or not.

The device preferably includes a reference projection formed on its outside surface which is masked by the tab when the tab is in its first position while being unmasked when the tab is in its other position.

In order to facilitate visual verification, the tab and said projection may be in contrasting colors.

In a preferred embodiment of the invention, the said tab is mounted to rotate about a transverse axis on the snap-fastening finger.

The tab and the snap-fastening finger include inclined ramps formed facing one another and suitable for co-operating with a portion of the complementary structure that engages between said inclined ramps while the device is being coupled, thereby causing the tab to be displaced into its said other position until the device reaches its correct coupling position.

The device also includes means for returning said tab to its first position, which means are advantageously constituted by a spring-forming elastically-deformable tongue interposed between said tab and the snap-fastening finger, and which may be integrally formed with said tab, having its free end bearing against the snap-fastening finger.

BRIEF DESCRIPTION OF THE DRAWING

An embodiment of the invention is described by way of example with reference to the accompanying drawing, in which.

DETAILED DESCRIPTION

Figure 1:
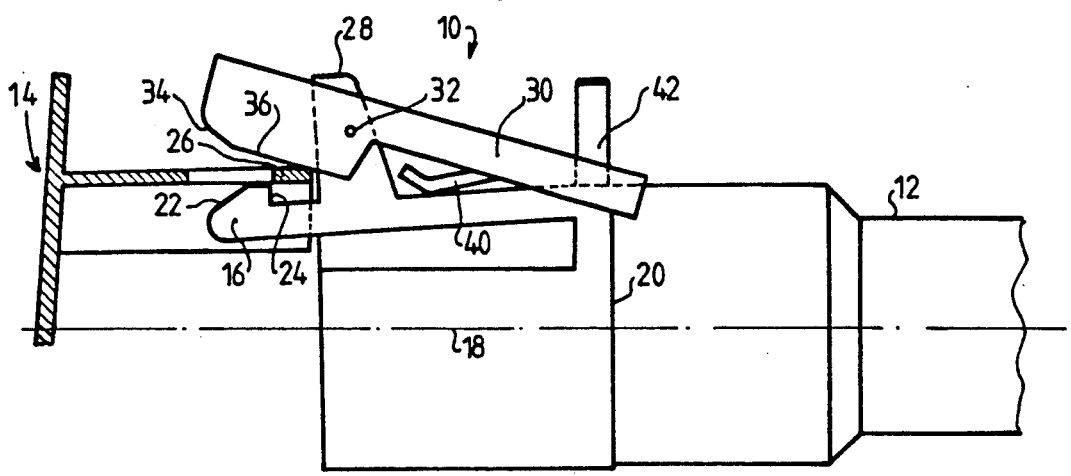
FIG. 1 is a diagrammatic elevation view of a quick coupling device of the invention shown in the process of being coupled.

The device of the invention, designated by overall reference 10, is mounted at the end of a fluid-passing duct or pipe 12 which is to be connected to another duct or tubular end-fitting (not shown) fitted with a special complementary structure 14 suitable for co-operating with the quick coupling device 10.

In the embodiment shown, the quick coupling device comprises at least one elastically deformable longitudinal finger 16 extending parallel to the axis 18 of the device 10 and connected to the body 20 thereof at one of its ends. At its opposite, free end, the finger 16 has a sloping ramp 22 formed on its radially outer face, with the ramp leading to a set-back 24, thereby forming a hook or catch for engaging against a transverse rod or bar 26 on the complementary structure 14.

Figure 2:
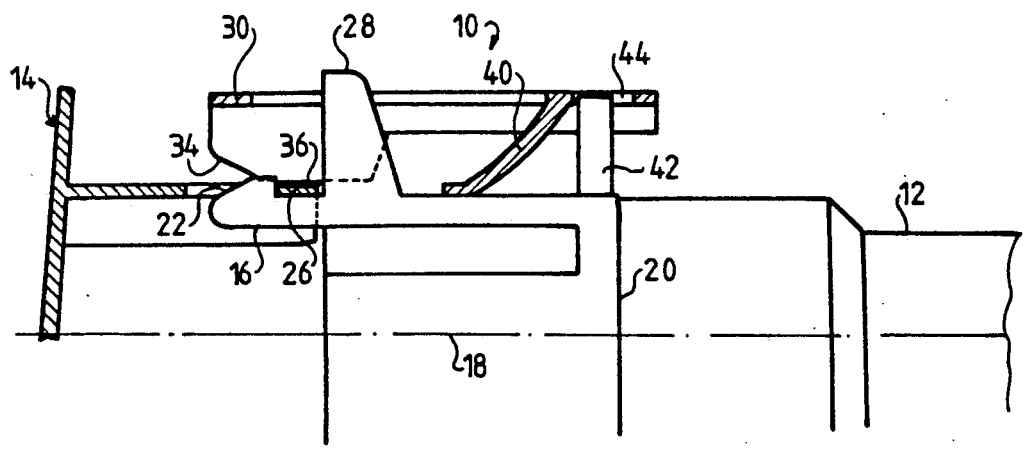
FIG. 2 is a fragmentary section through the device shown in its correct coupling position.

The snap-fastening finger 16 is also provided with an outwardly directed radial projection 28 having a tab 30 mounted thereon to rotate about a transverse axis 32. The tab 30 may be a channel section member, as can be seen in FIG. 2, and its free end is formed to have at least one inclined ramp 34 connecting to an abutment edge 36 running parallel to the axis 18 of the device 10. The dimensions of the tab 30 and the way it is mounted to rotate on the projection 28 of the finger 16 are such that, when the coupling is in its normal position as shown in FIG. 2, the bar 26 of the complementary structure 14 comes with a relatively small amount of clearance between the radially outer face of the snap-fastening finger 16 and the, or each, edge 36 of the tab 30.

The tab 30 includes a spring-forming tongue 40 which may be integrally formed with the tab 30 and whose free end merely bears against the outer surface of the snap-fastening finger 16.

The device 10 also includes a stud 42 projecting from its outside surface and extending radially, for example, with the stud being in alignment with a cut-out or orifice 44 in the rear end of the tab 30. The stud 42 is normally intended to be masked by the tab 30 when the tab extends parallel to the axis 18 of the coupling device 10, and to be unmasked by passing through the cut-out or orifice 44 of the tab 30 when the tab is at an angle relative to the axis 18 of the device.

The device of the invention operates as follows:

When the quick coupling device 10 fitted to the end of a pipe or duct 12 is presented in front of the tubular end fitting or duct to which it is to be connected, it is oriented in such a manner as to ensure that the transverse bar 26 of the complementary structure 14 faces the sloping ramps 22 and 34 of the snap-fastening finger 16 and of the tab 30.

At that time, the spring tongue 40 then holds the tab 30 in the position shown in FIG. 2 where the tab extends parallel to the axis 18 of the device 10.

The device 10 is then moved in translation in order to engage the transverse bar 26 between the snap-fastening finger 16 and the tab 30. During this motion, the snap-fastening finger 16 bends radially inwardly, as shown in FIG. 1, until the bar 26 has gone past the set-back 24. As it bends, the finger 16 causes the tab 30 whose edge 36 is in abutment against the bar 26 to rotate, thereby unmasking the stud 42.

When the device is in the correct coupling position as shown in FIG. 2, the finger 16 has returned to its normal position and the spring tongue 40 has returned the tab 30 to its position parallel to the axis 18 such that the stud 42 is masked.

It will be understood that when the tab 30 covers the stud 42, the quick coupling device is either in its correct coupling position on an appropriate complementary structure, or else is completely disengaged from said structure. However, if the stud 42 is visible through the tab 30, then the coupling device 10 is not correctly coupled to the complementary structure.

This visual verification can be further improved by the tab 30 and the stud 40 being in different, contrasting colors.

The device of the invention is applicable to all sorts of quick couplings for fluid ducts, and in particular in the car industry to the ducts used in the heating or air conditioning circuits for the vehicle cabin and in the circuits for cooling the vehicle engine.

I claim:

1. A quick coupling device for interconnecting two pipes such as those used in a circuit for heating a vehicle cabin or for cooling a vehicle engine, said device having a first portion mounted at an end of one of said pipes and cooperating with a second portion mounted on an end of the other of said pipes, said first portion having at least one elastically deformable snap-fastening finger means for engaging the device to the second portion, and further comprising a tab rotatably connected to the snap-fastening finger means by link means causing the tab to take up a first position when the snap-fastening finger means is in its engaging position coupling said first and second portions, and a second different position when the snap-fastening finger means is resiliently displaced from its second engaging position, said tab when in its first engaging position providing a visual confirmation that the device is correctly coupled.

2. A device according to claim 1, wherein the tab is mounted to rotate about the snap-fastening finger on an axis transverse to a longitudinal axis of said pipes and ducts.

3. A device according to claim 1, including return means for returning the tab to its first position.

4. A device according to claim 3, wherein the return means comprise a spring-forming elastically-deformable tongue interposed between the tab and the snap-fastening finger means.

5. A device according to claim 4, wherein the tongue is integrally formed with the tab and includes a free end pressed against the snap-fastening finger means.

6. A device according to claim 1, including a reference projection formed on its outside surface which is covered by the tab when the tab is in its first position while being uncovered when the tab is in its other position.

7. A device according to claim 6, wherein the tab includes an aperture for allowing said reference projection to pass therethrough.

8. A device according to claim 1, wherein the tab and the snap-fastening finger means include inclined ramps formed facing one another and suitable for co-operating with a portion of the second partition that engages between said inclined ramps while the device is being coupled, thereby causing the tab to be displaced from its first position until the device reaches engaging position coupling said first and second portions.

9. A quick coupling device for connecting together two fluid passing ducts or pipes comprising
a body member mounted on one of said ducts or pipes
an elastically deformable finger member fixed at said end of said body member and extending therefrom in a direction parallel to said longitudinal axis, said finger member having a sloping ramp portion remote from said end of said body member, a projection extending outwardly from said finger member and spaced away from said sloping ramp portion, and a set back recessed portion between said ramp portion and said projection adjacent said end of said body member;
a stud member connected to said body member having an end portion projecting away from said body member and spaced from said end of said body member;
an elongate tab member having first and second end portions separated by an edge portion, said first end portion having a ramp portion arranged adjacent and sloping oppositely to said sloping ramp portion of said finger member and said edge portion arranged adjacent said recessed portion of said finger member and an orifice being provided in said elongate tab member adjacent said second end portion thereof to slidably engage said stud member projecting from said body member, said elongate tab member masking from view a side portion of said stud when slidably engaged in said orifice and being rotatably mounted on said projection of said finger member to enable rotation about an axis transverse to said longitudinal axis of said body member;
spring means engaging said elongate tab member and said finger member to resiliently hold the edge portion of said elongate tab member closely adjacent said recessed portion of said finger member to impede access to said recessed portion and to hold closely adjacent the respective oppositely sloping ramp portions of said finger member and said elongate tab member and to position said elongate tab member such that the orifice thereof slidably engages said stud and such that the side portion of said stud which is masked from view is said end portion thereof;
an engagement member mounted on the other of said ducts having a rod-shaped portion transverse to said longitudinal axis of said body member being movable to advance parallel to said longitudinal axis to forcibly contact the respective oppositely sloping ramp portions of said finger member and said elongate tab member and cause said finger member and said elongate tab member to be resiliently separated and cause said tab member to be rotated and unmask the end portion of said stud until said rod-shaped member engages said recessed portion of said finger member and said elongate tab member is caused to rotate about said axis transverse to said longitudinal axis by resilient action of said spring member to resiliently hold the edge portion of said elongate tab member closely adjacent said recessed portion of said finger member.

* * * * *